United States Patent
Kim

(10) Patent No.: US 9,252,983 B2
(45) Date of Patent: Feb. 2, 2016

(54) METHOD AND SYSTEM FOR REDUCING RADIATED EMISSIONS FROM A COMMUNICATIONS CHANNEL

(75) Inventor: Andrew Joo Kim, Atlanta, GA (US)

(73) Assignee: Intersil Americas LLC, Milpitas, CA (US)

( * ) Notice: Subject to any disclaimer, the term of this patent is extended or adjusted under 35 U.S.C. 154(b) by 2049 days.

(21) Appl. No.: 11/789,899

(22) Filed: Apr. 26, 2007

(65) Prior Publication Data

US 2007/0253495 A1    Nov. 1, 2007

Related U.S. Application Data

(60) Provisional application No. 60/795,136, filed on Apr. 26, 2006.

(51) Int. Cl.
*H04L 25/02* (2006.01)
*H04L 25/03* (2006.01)

(52) U.S. Cl.
CPC ............ *H04L 25/02* (2013.01); *H04L 25/0288* (2013.01); *H04L 25/03343* (2013.01); *H04L 25/03828* (2013.01); *H04L 25/03878* (2013.01)

(58) Field of Classification Search
CPC ................ H04L 25/02; H04L 25/0288; H04L 25/03343; H04L 25/03828; H04L 27/367; H04L 27/368
USPC ................... 375/229–236, 296–297, 346–350
See application file for complete search history.

(56) References Cited

U.S. PATENT DOCUMENTS

| | | | |
|---|---|---|---|
| 2,632,058 A | 3/1953 | Gray | 178/15 |
| 3,445,771 A | 5/1969 | Clapham et al. | 325/42 |
| 3,571,725 A | 3/1971 | Kaneko et al. | 328/14 |
| 3,599,122 A | 8/1971 | Leuthold | 333/29 |

(Continued)

FOREIGN PATENT DOCUMENTS

| | | |
|---|---|---|
| EP | 0 527 966 B1 | 9/1994 |
| EP | 0 584 865 B1 | 3/2000 |

(Continued)

OTHER PUBLICATIONS

International Search Report, PCT/US07/10237, Apr. 21, 2008, 1 p.

(Continued)

*Primary Examiner* — Curtis Odom
(74) *Attorney, Agent, or Firm* — King & Spalding

(57) ABSTRACT

A communications channel may radiate energy undesirably, for example in the form of electromagnetic radiation, when a communication signal transmits over the communications channel. Processing the signal before and after transmission on the communications channel can reduce the level of radiated energy. Signal processing in advance of transmission over the communications channel can transform the communication signal into a waveform that has a reduced propensity to emit radiated energy during transmission over the communications channel. Exemplary signal transformations can involve applying either frequency-selective or broadband attenuation to the communication signal. Following transmission of the waveform over the communications channel, the original communication signal can be restored via reversing the signal transformation. The reverse transformation can comprise applying frequency-selective gain or broadband gain to the transmitted waveform.

12 Claims, 4 Drawing Sheets

(56) References Cited

U.S. PATENT DOCUMENTS

| | | | |
|---|---|---|---|
| 3,633,108 A | 1/1972 | Kneuer | 325/323 |
| 3,714,437 A | 1/1973 | Kinsel | 359/185 |
| 3,806,915 A | 4/1974 | Higgins et al. | 340/347 |
| 3,879,690 A * | 4/1975 | Golant et al. | 333/204 |
| 3,977,795 A | 8/1976 | Buschmann | 356/256 |
| 4,201,909 A | 5/1980 | Dogliotti et al. | 455/608 |
| 4,287,756 A | 9/1981 | Gallagher | 73/61.1 R |
| 4,288,872 A | 9/1981 | Tamburelli | 375/14 |
| 4,349,914 A | 9/1982 | Evans | 375/40 |
| 4,363,127 A | 12/1982 | Evans et al. | 375/30 |
| 4,386,339 A | 5/1983 | Henry et al. | 340/347 |
| 4,387,461 A | 6/1983 | Evans | 371/5 |
| 4,393,499 A | 7/1983 | Evans | 371/5 |
| 4,410,878 A | 10/1983 | Stach | 340/347 DD |
| 4,464,771 A | 8/1984 | Sorensen | 375/120 |
| 4,470,126 A | 9/1984 | Haque | 364/825 |
| 4,475,227 A | 10/1984 | Belfield | 381/30 |
| 4,479,266 A | 10/1984 | Eumurian et al. | 455/608 |
| 4,521,883 A | 6/1985 | Roché | 370/100 |
| 4,580,263 A | 4/1986 | Watanabe et al. | 371/5 |
| 4,584,720 A | 4/1986 | Garrett | 455/608 |
| 4,618,941 A | 10/1986 | Linder et al. | 364/724 |
| 4,646,173 A | 2/1987 | Kammeyer et al. | 360/51 |
| 4,651,026 A | 3/1987 | Serfaty et al. | 307/269 |
| 4,668,988 A * | 5/1987 | Sasaki | H04N 5/14 333/14 |
| 4,720,839 A | 1/1988 | Feher et al. | |
| 4,751,497 A | 6/1988 | Torii | 340/347 |
| 4,830,493 A | 5/1989 | Giebeler | 356/328 |
| 4,847,521 A | 7/1989 | Huignard et al. | 307/425 |
| 4,864,590 A | 9/1989 | Arnon et al. | 375/14 |
| 4,873,700 A | 10/1989 | Wong | 375/76 |
| 4,912,726 A | 3/1990 | Iwamatsu et al. | 375/20 |
| 4,942,593 A | 7/1990 | Whiteside et al. | 375/118 |
| 4,953,041 A | 8/1990 | Huber | 360/46 |
| 4,959,535 A | 9/1990 | Garrett | 250/214 R |
| 4,978,957 A | 12/1990 | Hotta et al. | 341/156 |
| 5,007,106 A | 4/1991 | Kahn et al. | 455/619 |
| 5,008,957 A | 4/1991 | Klyono | 455/618 |
| 5,012,475 A | 4/1991 | Campbell | 372/29 |
| 5,067,126 A | 11/1991 | Moore | 370/112 |
| 5,072,221 A | 12/1991 | Schmidt | 341/159 |
| 5,111,065 A | 5/1992 | Roberge | 307/270 |
| 5,113,278 A | 5/1992 | Degura et al. | 359/154 |
| 5,115,450 A | 5/1992 | Arcuri | 375/7 |
| 5,121,411 A | 6/1992 | Fluharty | 375/20 |
| 5,128,790 A | 7/1992 | Heidemann et al. | 359/132 |
| 5,132,639 A | 7/1992 | Blauvelt et al. | 330/149 |
| 5,151,698 A | 9/1992 | Pophillat | 341/52 |
| 5,157,531 A * | 10/1992 | Foglia | 398/135 |
| 5,181,034 A | 1/1993 | Takakura et al. | 341/144 |
| 5,181,136 A | 1/1993 | Kavehrad et al. | 359/190 |
| 5,184,131 A | 2/1993 | Ikeda | 341/165 |
| 5,208,833 A | 5/1993 | Erhart et al. | 375/20 |
| 5,222,103 A | 6/1993 | Gross | 375/54 |
| 5,223,834 A | 6/1993 | Wang et al. | 341/136 |
| 5,225,798 A | 7/1993 | Hunsinger et al. | 333/165 |
| 5,237,590 A | 8/1993 | Kazawa et al. | 375/20 |
| 5,243,613 A | 9/1993 | Gysel et al. | 372/26 |
| 5,252,930 A | 10/1993 | Blauvelt | 330/149 |
| 5,282,072 A | 1/1994 | Nazarathy et al. | 359/157 |
| 5,283,679 A | 2/1994 | Wedding | 359/154 |
| 5,291,031 A | 3/1994 | MacDonald et al. | 250/577 |
| 5,293,406 A | 3/1994 | Suzuki | 375/59 |
| 5,300,930 A | 4/1994 | Burger et al. | 341/96 |
| 5,321,543 A | 6/1994 | Huber | 359/187 |
| 5,321,710 A | 6/1994 | Cornish et al. | 372/26 |
| 5,327,279 A | 7/1994 | Farina et al. | 359/180 |
| 5,343,322 A | 8/1994 | Pirio et al. | 359/173 |
| 5,351,148 A | 9/1994 | Maeda et al. | 359/124 |
| 5,355,240 A | 10/1994 | Prigent et al. | 359/161 |
| 5,361,156 A | 11/1994 | Pidgeon | 359/161 |
| 5,371,625 A | 12/1994 | Wedding et al. | 319/173 |
| 5,373,384 A | 12/1994 | Hebert | 359/161 |
| 5,376,786 A | 12/1994 | MacDonald | 250/227.12 |
| 5,382,955 A | 1/1995 | Knierim | 341/64 |
| 5,387,887 A | 2/1995 | Zimmerman et al. | 333/166 |
| 5,408,485 A | 4/1995 | Ries | 372/38 |
| 5,413,047 A | 5/1995 | Evans et al. | 102/302 |
| 5,416,628 A | 5/1995 | Betti et al. | 359/181 |
| 5,418,637 A | 5/1995 | Kuo | 359/161 |
| 5,424,680 A | 6/1995 | Nazarathy et al. | 330/149 |
| 5,428,643 A | 6/1995 | Razzell | 375/308 |
| 5,428,831 A | 6/1995 | Monzello et al. | 455/296 |
| 5,436,752 A | 7/1995 | Wedding | 359/195 |
| 5,436,756 A | 7/1995 | Knox et al. | 359/260 |
| 5,444,864 A | 8/1995 | Smith | 455/84 |
| 5,450,044 A | 9/1995 | Hulick | 332/103 |
| 5,481,389 A | 1/1996 | Pidgeon et al. | 359/161 |
| 5,481,568 A | 1/1996 | Yada | 375/340 |
| 5,483,552 A | 1/1996 | Shimazaki et al. | 375/233 |
| 5,504,633 A | 4/1996 | Van Den Enden | 360/65 |
| 5,510,919 A | 4/1996 | Wedding | 359/115 |
| 5,515,196 A | 5/1996 | Kitajima et al. | 359/180 |
| 5,528,710 A | 6/1996 | Burton et al. | 385/16 |
| 5,541,955 A | 7/1996 | Jacobsmeyer | 375/222 |
| 5,548,253 A | 8/1996 | Durrant | 332/103 |
| 5,557,439 A | 9/1996 | Alexander et al. | 359/130 |
| 5,574,743 A | 11/1996 | van der Poel et al. | 372/46 |
| 5,574,978 A | 11/1996 | Talwar et al. | |
| 5,589,786 A | 12/1996 | Bella et al. | 327/108 |
| 5,604,724 A | 2/1997 | Shiokawa | |
| 5,606,734 A | 2/1997 | Bahu | 455/303 |
| 5,612,653 A | 3/1997 | Dodds et al. | 333/124 |
| 5,617,135 A | 4/1997 | Noda et al. | 348/12 |
| 5,621,764 A | 4/1997 | Ushirokawa et al. | 375/317 |
| 5,625,360 A | 4/1997 | Garrity et al. | 341/144 |
| 5,625,722 A | 4/1997 | Froberg et al. | 385/1 |
| 5,644,325 A | 7/1997 | King et al. | 345/20 |
| 5,648,987 A | 7/1997 | Yang et al. | 375/232 |
| 5,670,871 A | 9/1997 | Man et al. | 324/96 |
| 5,675,600 A | 10/1997 | Yamamoto | 372/38 |
| 5,678,198 A | 10/1997 | Lemson | 455/67.1 |
| 5,689,356 A | 11/1997 | Rainal | 359/181 |
| 5,691,978 A | 11/1997 | Kenworthy | 370/278 |
| 5,692,011 A | 11/1997 | Nobakht et al. | 375/233 |
| 5,699,022 A | 12/1997 | Tovar | 333/18 |
| 5,706,008 A | 1/1998 | Huntley, Jr. et al. | 341/156 |
| 5,721,315 A | 2/1998 | Evans et al. | 525/74 |
| 5,723,176 A | 3/1998 | Keyworth et al. | 427/163.2 |
| 5,751,726 A | 5/1998 | Kim | 371/6 |
| 5,754,681 A | 5/1998 | Watanabe et al. | 382/159 |
| 5,757,763 A | 5/1998 | Green et al. | 369/275.3 |
| 5,761,243 A | 6/1998 | Russell et al. | 375/233 |
| 5,764,542 A | 6/1998 | Gaudette et al. | 364/574 |
| 5,774,505 A | 6/1998 | Baugh | 375/348 |
| 5,783,630 A | 7/1998 | Evans et al. | 525/74 |
| 5,784,032 A | 7/1998 | Johnston et al. | 343/702 |
| 5,790,595 A | 8/1998 | Benthin et al. | 375/224 |
| 5,798,854 A | 8/1998 | Blauvelt et al. | 359/161 |
| 5,801,657 A | 9/1998 | Fowler et al. | 341/155 |
| 5,802,089 A | 9/1998 | Link | 372/38 |
| 5,812,578 A | 9/1998 | Schemmann et al. | 372/46 |
| 5,825,211 A | 10/1998 | Smith et al. | 327/19 |
| 5,825,257 A | 10/1998 | Klymyshyn et al. | 332/100 |
| 5,825,825 A | 10/1998 | Altmann et al. | 375/293 |
| 5,828,329 A | 10/1998 | Burns | 341/155 |
| 5,835,848 A | 11/1998 | Bi et al. | 455/24 |
| 5,839,105 A | 11/1998 | Ostendorf et al. | 704/256 |
| 5,841,841 A | 11/1998 | Dodds et al. | 379/93.08 |
| 5,844,436 A | 12/1998 | Altmann | 327/156 |
| 5,848,139 A | 12/1998 | Grover | 379/114 |
| 5,850,409 A | 12/1998 | Link | 372/38 |
| 5,850,505 A | 12/1998 | Grover et al. | 395/182.02 |
| 5,852,389 A | 12/1998 | Kumar et al. | 332/103 |
| 5,859,862 A | 1/1999 | Hikasa et al. | 372/38 |
| 5,861,966 A | 1/1999 | Ortel | 351/125 |
| 5,872,468 A | 2/1999 | Dyke | 327/72 |
| 5,878,390 A | 3/1999 | Kawai et al. | 704/231 |
| 5,880,870 A | 3/1999 | Sieben et al. | 359/181 |
| 5,883,910 A | 3/1999 | Link | 372/38 |
| 5,887,022 A | 3/1999 | Lee et al. | 375/202 |
| 5,889,759 A | 3/1999 | McGibney | 370/207 |
| 5,896,392 A | 4/1999 | Ono et al. | 371/5.2 |

(56) References Cited

U.S. PATENT DOCUMENTS

| | | | |
|---|---|---|---|
| 5,912,749 A | 6/1999 | Harstead et al. | 359/123 |
| 5,920,600 A | 7/1999 | Yamaoka et al. | 375/376 |
| 5,923,226 A | 7/1999 | Kakura et al. | 333/18 |
| 5,942,576 A | 8/1999 | Evans et al. | 525/73 |
| 5,943,380 A | 8/1999 | Marchesani et al. | 375/376 |
| 5,943,457 A | 8/1999 | Hayward et al. | 385/24 |
| 5,949,926 A | 9/1999 | Davies | 385/3 |
| 5,959,032 A | 9/1999 | Evans et al. | 525/74 |
| 5,959,750 A | 9/1999 | Eskildsen et al. | 359/134 |
| 5,965,667 A | 10/1999 | Evans et al. | 525/74 |
| 5,968,198 A | 10/1999 | Hassan et al. | 714/752 |
| 5,978,417 A | 11/1999 | Baker et al. | 375/232 |
| 5,983,178 A | 11/1999 | Naito et al. | 704/245 |
| 5,985,999 A | 11/1999 | Dominguez et al. | 525/74 |
| 5,995,565 A | 11/1999 | Tong et al. | 375/346 |
| 5,999,300 A | 12/1999 | Davies et al. | 359/183 |
| 6,002,274 A | 12/1999 | Smith et al. | 327/19 |
| 6,002,717 A | 12/1999 | Gaudet | 375/232 |
| 6,009,424 A | 12/1999 | Lepage et al. | 707/6 |
| 6,011,952 A | 1/2000 | Dankberg et al. | 455/24 |
| 6,021,110 A | 2/2000 | McGibney | 370/208 |
| 6,028,658 A | 2/2000 | Hamada et al. | 352/129 |
| 6,031,048 A | 2/2000 | Evans et al. | 525/73 |
| 6,031,866 A | 2/2000 | Oler et al. | 375/219 |
| 6,031,874 A | 2/2000 | Chennakeshu et al. | 375/262 |
| 6,034,996 A | 3/2000 | Herzberg | 375/265 |
| 6,035,080 A | 3/2000 | Henry et al. | 385/24 |
| 6,041,299 A | 3/2000 | Schuster et al. | 704/232 |
| 6,052,420 A | 4/2000 | Yeap et al. | 375/346 |
| 6,072,364 A | 6/2000 | Jeckeln et al. | 330/149 |
| 6,072,615 A | 6/2000 | Mamyshev | 359/183 |
| 6,078,627 A | 6/2000 | Crayford | 375/286 |
| 6,084,931 A | 7/2000 | Powell, II et al. | 375/355 |
| 6,091,782 A | 7/2000 | Harano | 375/287 |
| 6,093,496 A | 7/2000 | Dominguez et al. | 428/500 |
| 6,093,773 A | 7/2000 | Evans et al. | 525/74 |
| 6,108,474 A | 8/2000 | Eggleton et al. | 385/122 |
| 6,111,477 A | 8/2000 | Klymyshyn et al. | 333/139 |
| 6,118,563 A | 9/2000 | Boskovic et al. | 359/124 |
| 6,118,567 A | 9/2000 | Alameh et al. | 359/189 |
| 6,127,480 A | 10/2000 | Dominguez et al. | 525/74 |
| 6,140,416 A | 10/2000 | Evans et al. | 525/74 |
| 6,140,858 A | 10/2000 | Dumont | 327/317 |
| 6,140,972 A | 10/2000 | Johnston et al. | 343/725 |
| 6,141,127 A | 10/2000 | Boivin et al. | 359/124 |
| 6,141,387 A | 10/2000 | Zhang | 375/261 |
| 6,148,428 A | 11/2000 | Welch et al. | 714/752 |
| 6,151,150 A | 11/2000 | Kikuchi | 359/194 |
| 6,154,301 A | 11/2000 | Harvey | 359/193 |
| 6,163,638 A | 12/2000 | Eggleton et al. | 385/37 |
| 6,169,764 B1 | 1/2001 | Babanezhad | 375/233 |
| 6,169,912 B1 | 1/2001 | Zuckerman | 455/570 |
| 6,181,454 B1 | 1/2001 | Nagahori et al. | 359/189 |
| 6,191,719 B1 | 2/2001 | Bult et al. | 341/144 |
| 6,201,916 B1 | 3/2001 | Eggleton et al. | 385/122 |
| 6,208,792 B1 | 3/2001 | Hwang et al. | 385/129 |
| 6,211,978 B1 | 4/2001 | Wojtunik | 359/114 |
| 6,212,654 B1 | 4/2001 | Lou et al. | 714/701 |
| 6,214,914 B1 | 4/2001 | Evans et al. | 524/323 |
| 6,215,812 B1 | 4/2001 | Young et al. | 375/144 |
| 6,219,633 B1 | 4/2001 | Lepage | 704/9 |
| 6,222,861 B1 | 4/2001 | Kuo et al. | 372/20 |
| 6,226,112 B1 | 5/2001 | Denk et al. | 359/138 |
| 6,236,963 B1 | 5/2001 | Naito et al. | 704/264 |
| 6,259,836 B1 | 7/2001 | Dodds | 385/24 |
| 6,259,847 B1 | 7/2001 | Lenz et al. | 385/131 |
| 6,268,816 B1 | 7/2001 | Bult et al. | 341/144 |
| 6,271,690 B1 | 8/2001 | Hirano et al. | 327/75 |
| 6,271,944 B1 | 8/2001 | Schemmann et al. | 359/124 |
| 6,281,824 B1 | 8/2001 | Masuda | 341/144 |
| 6,285,709 B1 | 9/2001 | Alelyunas et al. | |
| 6,288,668 B1 | 9/2001 | Tsukamoto et al. | 341/172 |
| 6,289,055 B1 | 9/2001 | Knotz | 375/286 |
| 6,289,151 B1 | 9/2001 | Kazarinov et al. | 385/32 |
| 6,295,325 B1 | 9/2001 | Farrow et al. | 375/327 |
| 6,297,678 B1 | 10/2001 | Gholami | 327/198 |
| 6,298,459 B1 | 10/2001 | Tsukamoto | 714/746 |
| 6,304,199 B1 | 10/2001 | Fang et al. | 341/118 |
| 6,311,045 B1 | 10/2001 | Domokos | 455/78 |
| 6,313,713 B1 | 11/2001 | Ho et al. | 333/1.1 |
| 6,314,147 B1 | 11/2001 | Liang et al. | 375/346 |
| 6,317,247 B1 | 11/2001 | Yang et al. | 359/245 |
| 6,317,469 B1 | 11/2001 | Herbert | 375/293 |
| 6,341,023 B1 | 1/2002 | Puc | 359/124 |
| 6,356,374 B1 | 3/2002 | Farhan | 359/180 |
| 6,388,786 B1 | 5/2002 | Ono et al. | 359/181 |
| 6,411,117 B1 | 6/2002 | Hatamian | 324/765 |
| 6,421,155 B1 | 7/2002 | Yano | 359/181 |
| 6,445,476 B1 | 9/2002 | Kahn et al. | 359/184 |
| 6,473,131 B1 | 10/2002 | Neugebauer et al. | 348/572 |
| 6,501,792 B2 | 12/2002 | Webster | 375/232 |
| 6,539,204 B1 | 3/2003 | Marsh et al. | 455/63 |
| 6,560,257 B1 | 5/2003 | DeSalvo et al. | 372/38.02 |
| 6,597,746 B1 * | 7/2003 | Amrany et al. | 375/296 |
| 6,650,189 B1 | 11/2003 | Romao | |
| 6,665,348 B1 | 12/2003 | Feher | 375/259 |
| 6,665,500 B2 | 12/2003 | Snawerdt | 398/185 |
| 6,718,138 B1 | 4/2004 | Sugawara | 398/9 |
| 6,751,587 B2 | 6/2004 | Thyssen et al. | 704/228 |
| 6,816,101 B2 | 11/2004 | Hietala et al. | 341/155 |
| 6,819,166 B1 | 11/2004 | Choi et al. | 327/551 |
| 6,819,943 B2 | 11/2004 | Dalal | |
| 6,920,315 B1 | 7/2005 | Wilcox et al. | |
| 6,961,019 B1 | 11/2005 | McConnell et al. | 342/357.1 |
| 7,035,361 B2 | 4/2006 | Kim et al. | 375/350 |
| 7,050,388 B2 | 5/2006 | Kim et al. | 370/201 |
| 7,123,676 B2 | 10/2006 | Gebara et al. | |
| 7,149,256 B2 | 12/2006 | Vrazel et al. | |
| 7,173,551 B2 | 2/2007 | Vrazel et al. | |
| 7,212,580 B2 | 5/2007 | Hietala et al. | |
| 7,215,721 B2 | 5/2007 | Hietala et al. | |
| 7,307,569 B2 | 12/2007 | Vrazel et al. | |
| 2001/0024542 A1 | 9/2001 | Aina et al. | 385/24 |
| 2001/0043649 A1 * | 11/2001 | Farjad-Rad | 375/375 |
| 2002/0086640 A1 | 7/2002 | Belcher et al. | 455/63.1 |
| 2002/0196508 A1 | 12/2002 | Wei et al. | 359/183 |
| 2003/0002121 A1 | 1/2003 | Miyamoto et al. | |
| 2003/0007631 A1 | 1/2003 | Bolognesi et al. | |
| 2003/0008628 A1 | 1/2003 | Lindell et al. | 455/180.1 |
| 2003/0030876 A1 | 2/2003 | Takei | 359/187 |
| 2003/0053534 A1 | 3/2003 | Sivadas et al. | 375/229 |
| 2003/0058976 A1 | 3/2003 | Ohta et al. | 375/350 |
| 2003/0063354 A1 | 4/2003 | Davidson | 359/189 |
| 2003/0067990 A1 | 4/2003 | Bryant | 375/259 |
| 2003/0108110 A1 * | 6/2003 | Harres | H04L 25/08 375/259 |
| 2004/0053578 A1 | 3/2004 | Grabon et al. | |
| 2004/0105462 A1 | 6/2004 | Kim et al. | |
| 2004/0114888 A1 | 6/2004 | Rich et al. | |
| 2004/0190661 A1 * | 9/2004 | Vrazel | 375/350 |
| 2004/0197103 A1 | 10/2004 | Roberts et al. | 398/159 |
| 2004/0213354 A1 | 10/2004 | Jones et al. | 375/285 |
| 2004/0218756 A1 | 11/2004 | Tang et al. | 379/417 |
| 2005/0030884 A1 * | 2/2005 | Kim et al. | 370/201 |
| 2005/0069063 A1 | 3/2005 | Waltho et al. | 375/346 |
| 2005/0180520 A1 | 8/2005 | Kim et al. | |
| 2006/0140644 A1 * | 6/2006 | Paolella | H03F 3/08 398/189 |
| 2006/0146966 A1 | 7/2006 | Golanbari et al. | |
| 2006/0159002 A1 | 7/2006 | Kim et al. | |
| 2006/0178157 A1 | 8/2006 | Gebara et al. | |
| 2006/0291598 A1 | 12/2006 | Gebara et al. | |
| 2007/0060059 A1 | 3/2007 | Kim et al. | |
| 2007/0064923 A1 | 3/2007 | Schmukler et al. | |
| 2007/0092265 A1 | 4/2007 | Vrazel et al. | |
| 2007/0171998 A1 | 7/2007 | Hietala et al. | |

FOREIGN PATENT DOCUMENTS

| | | |
|---|---|---|
| GB | 2 223 369 A | 4/1990 |
| GB | 2 306 066 A | 4/1997 |
| JP | 62082659 | 10/1988 |
| JP | H01-270432 | 10/1989 |
| JP | 1990000063162 | 11/1991 |

(56) References Cited

FOREIGN PATENT DOCUMENTS

| | | |
|---|---|---|
| JP | 04187738 | 7/1992 |
| JP | H05-063504 | 3/1993 |
| JP | H06-029984 | 2/1994 |
| JP | 08079186 A | 3/1996 |
| JP | 2000-252801 | 9/2000 |
| WO | WO 99/45683 A1 | 9/1999 |
| WO | WO 01/41346 A2 | 6/2001 |
| WO | WO 02/067521 A1 | 8/2002 |
| WO | WO 02/082694 A1 | 10/2002 |
| WO | WO 02/091600 A2 | 11/2002 |
| WO | WO 03/071731 A1 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/018134 A2 | 2/2005 |
| WO | WO 2005/050896 A2 | 6/2005 |
| WO | WO 2006/065883 A2 | 6/2006 |

OTHER PUBLICATIONS

André et al.; *InP DHBT Technology and Design Methodology for High-Bit-Rate Optical Communications Circuits*; IEEE Journal of Solid-State Circuits; vol. 33, No. 9, Sep. 1998; pp. 1328-1335.

Borjak et al.; *High-Speed Generalized Distributed-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Application for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15th Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Choi et al.; *A 0.18-µm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Downie et al.; *Performance Monitoring of Optical Networks with Synchronous and Asynchronous Sampling*; Corning Incorporated, Science and Technology; SP-AR-02-1; p. WDD50-1; Abstract.

Enning et al.; *Design and Test of Novel Integrate and Dump Filter (I&D) for Optical Gbit/s System Applications*; Electronics Letters; (Nov. 21, 1991); vol. 27, No. 24; pp. 2286-2288.

Fürst et al.; *Performance Limits of Nonlinear RZ and NRZ Coded Transmission at 10 and 40 Gb/s on Different Fibers*; pp. 302-304.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24th European Conference on Optical Communication; Sep. 1998; pp. 145-147.

Jutzi, Wilhelm; *Microwave Bandwidth Active Transversal Filter Concept with MESFETs*; IEEE Transactions on Microwave Theory and Technique, vol. MTT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Lee et al.; *Effects of Decision Ambiguity Level on Optical Receiver Sensitivity*; IEEE Photonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No. 1; Jan. 1993; pp. 82-105.

Oehler et al.; *A 3.6 Gigasample/s 5 bit Analog to Digital Converter Using 0.3 µm AlGaAs-HEMT Technology*; IEEE; (1993); pp. 163-164.

Ohm et al.; *Quaternary Optical ASK-DPSK and Receivers with Direct Detection*; IEEE Photonics Technology Letters; Jan. 2003; vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27th Eur. Conf. on Opt. Comm. (ECOC'01—Amsterdam); vol. 3; Sep. 30 to Oct. 4, 2001; pp. 456-457.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Multilevel Modulation in OFDM Systems*; IEEE; (1998); pp. 821-824.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Runge et al.; *High-Speed Circuits for Lightwave Communications*; 1999; World Scientific, pp. 181-184.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

(56) References Cited

OTHER PUBLICATIONS

Shtaif et al.; *Limits on the Spectral Efficiency of Intensity Modulated Direct Detection Systems with Optical Amplifiers*; AT&T Labs Research; pp. MM1-1-MM1-3.

Su et al.; *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Vorenkamp et al.; *A 1Gs/s, 10b Digital-to-Analog Converter*; ISSCC94/Session 3/Analog Techniques/Paper WP 3.3; pp. 52-53.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al.; *Multilevel Signaling for Increasing the Reach of 10 Gb/s Lightwave Systems*; IEEE Journal of Lightwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

Wedding et al.; *Multi-Level Dispersion Supported Transmission at 20 Gbit/s Over 46 km Installed Standard Singlemode Fibre*; 22$^{th}$ European Conference on Optical Communication; 1996; pp. 91-94.

Wedding et al.; *Fast Adaptive Control for Electronic Equalization of PMD*; Optical Society of America; (2000); pp. TuP4-1-TuP4-3.

Weger et al.; *Gilbert Multiplier as an Active Mixer with Conversion Gain Bandwidth of up to 17GHz*; Electronics Letters; 28$^{th}$ Mar. 1991; vol. 27, No. 7; pp. 570-571.

Westphal et al.; *Lightwave Communications*; 1994; Thursday Afternoon/CLEO '94; pp. 337-338.

Williamson et al., *Performance Analysis of Adaptive Wideband Duplexer*; 2003 Australian Telecommunications, Networks and Applications Conference (ATNAC); Dec. 8-10, 2003.

Wilson et al.; *Predistortion of Electroabsorption Modulators for Analog CATV Systems at 1.55 μm*; Journal of Lightwave Technology; vol. 15, No. 9; Sep. 1997; pp. 1654-1662.

Author: Unknown; *Digital Carrier Modulation Schemes*; Title: Unknown; Date: Unknown; pp. 380-442.

\* cited by examiner

METHOD AND SYSTEM FOR REDUCING RADIATED EMISSIONS FROM A COMMUNICATIONS CHANNEL

CROSS REFERENCE TO RELATED APPLICATIONS

This application claims the benefit of priority to U.S. Provisional Patent Application No. 60/795,136, entitled "Method and System for Reducing Radiated Emissions from a Communications Channel" and filed Apr. 26, 2006, the entire contents which are hereby incorporated herein by reference.

FIELD OF THE INVENTION

The present invention relates to the field of communications, and more specifically to reducing radiated emissions from signals transmitting on a communications channel, such as a signal conductor, via processing the signals before and after transmission on the channel.

BACKGROUND

Modern communication typically involves transmitting signals from one point to another point over, on, or through a communications channel or a signal path. The signals are encoded or imprinted with data (or analog information) so that transmission of the signals conveys data or information between the two points.

The communications channel can comprise a wire, a cable, a conductive medium of copper or some metal that is embedded in or attached to an insulator or dielectric material, a transmission line, a trace on a printed circuit board or a ceramic substrate, a signal path, etc. The communications channel may carry digital or analog information between two points that are within a single enclosure or housing, that are on a common substrate, that are disposed across a room from one another, that may exist on a back plane, or that are remote with respect to one another, to list a few possibilities. For example, the communications channel can comprise a serial or parallel data bus in applications such as memory interfaces, video or display interfaces, or some other communications or computing context.

Many conventional communications channels undesirably radiate a portion of the signal energy that transmits thereon. As signals flow along the communications channel, some signal energy may escape or spill out of the channel, typically transverse to or distinct from the intended direction of signal propagation.

This phenomenon is particularly relevant to signals having high-frequency components. For example, digital signals often comprise high frequencies associated with transitions between digital states, e.g. "digital one" and "digital zero". The high frequency signal components provide sharp (or short) "rise times" that help detector systems distinguish between the digital states to read or decode the information that the signals carry. As the frequency content of the communicated signal increases, the power or intensity of the associated electromagnetic ("EM") radiation emitted from the channel also increases.

As communication equipment and services evolve and become more sophisticated, communications channels are called upon to provide increased bandwidth or to carry more data. Increasing the communication speed to achieve expanded bandwidth typically involves transmitting higher signal frequencies. As discussed above, those higher frequencies are prone to causing the communications channel to emit radiation undesirably. Accordingly, as the bandwidth of the communicated signal is increased, typically for communicating data at a faster rate or for providing sharper rise times, the amount of EM radiation increases. For example, a conventional communications channel transmitting data at a rate on the order of 10 Giga bits per second (Gbps) or higher may emit a detrimental level of EM radiation.

The increased radiation can be problematic for multiple reasons. First, the radiation can be received as noise by other electrical channels and circuits within the same device or operating in some proximity thereof. This noise can be severe enough to cause data errors in digital systems or to produce noticeable degradation in audio or video signal quality of an analog audio or video device.

As a second problem, radiation emitted by a communications channel of a first device can be severe enough to be received as noise by a nearby second device. Devices having antennas are especially susceptible, as antennas are designed to pick up radio signals, which are a form of EM radiation. Exemplary second devices so impacted include mobile phones, global positioning sensor ("GPS") receivers, televisions and radios receiving over-the-air signals through antennas, and wireless network communications devices (such as based on IEEE 802.11 standards). In such applications, the EM radiation emitted from the first device can cause a degraded signal or, in more severe cases, a loss of signal in the second device.

A third problem associated with radiated emissions concerns compliance with communication regulations. To help prevent one communication device interfering with operation of another device, government entities such as the Federal Communication Commission ("FCC") often impose limits on the EM power that a device is allowed to emit. Achieving product design initiatives while ensuring compliance with FCC regulations is often challenging for designs that rely on conventional technologies. Moreover, allowing EM power to radiate from a communications channel poses a risk of violating a government imposed limit.

One conventional technology for confining EM radiation emitted from a channel involves physically shielding the channel via surrounding or encasing the channel in conductive material that blocks the emitted radiation. One disadvantage of such conventional shields is the physical space that the encasing and associated materials occupy. With a trend towards increasingly compact communication systems, for example in connection with handheld applications, the occupied space of such conventional shielding technologies can present a significant disadvantage.

Another conventional approach to addressing radiated emissions involves differential signaling. In differential signaling, a pair of conductors (rather than just a single conductor and an associated ground) typically carry the electrical signal. The pair of conductors communicate a single signal by carrying both the intended signal and its negated (or antipodal or complementary) version. Each of the paired conductors emits radiation that is opposite of (or out of phase with respect to) its companion conductor. Consequently, the total radiation that the pair emits is relatively low, as the emitted radiation waves tend to cancel one another. While frequently effective in reducing EM radiation, differential signaling generally doubles the number of conductors (and associated electrical contacts) in a communications system. The resulting increase in components, costs, and complexity is often undesirable. Moreover, in many circumstances involving high-speed signals, differential signaling provides a less than adequate level of radiation suppression.

To address these representative deficiencies in the art, what is needed is a capability for reducing radiated emissions from a communications channel or signal path. A further need exists for a capability to adapt or shape communication signals to provide signal waveforms that avoid emitting problematic radiation during transmission over a communications channel. Yet another need exists for a technology that can transform adapted or shaped communication signals back to their original state following transmission over a communications channel, thereby facilitating robust or low-error-rate detection. One more need exists for a system and/or method that can process a signal at the input and the output ends of a communications channel to reduce radiated emissions without adversely impacting reception, detection, encoding, or interpretation of the signal at the output end. Addressing or more of these needs (or some related deficit in the art) would facilitate higher data rates, more robust communications, smaller or more cost-effective communication or computing appliances, less interference, and/or a general advance in the communication and computing arts.

SUMMARY

The present invention supports reducing the amount of radiation that a communications channel emits in connection with transmitting communication signals over the channel. Reducing radiated emissions can facilitate enhanced bandwidth or data carrying capabilities, higher communication speed, less interference, and/or more robust operation, to mention just a few potential benefits.

In one aspect of the present invention, a communications channel may have a propensity to radiate unwanted energy, in the form of electromagnetic radiation, when a communication signal transmits over, on, through, or in the communications channel. Among other possibilities, the communications channel can be a medium or a conductor that provides a signal path. For example, a communications channel can comprise one or more signal lines of a circuit board, backplane, wire, cable, computing device, or communication system (not an exhaustive list), wherein each signal line carries one or more signals. Processing a signal applied before and after transmitting the signal on the communications channel can reduce the level of energy radiated from the communications channel. Signal processing in advance of transmission over the communications channel can comprise transforming, modifying, shaping, adapting, altering, or distorting the communication signal to provide a changed signal. Among other possibilities, such signal processing can comprise attenuating, suppressing, or removing energy from one or more (or essentially all) frequencies of the communication signal. The changed signal can have a reduced propensity to produce radiated electromagnetic energy during propagation over the communications channel. Following transmission of the changed signal over the communications channel, the changed signal can be processed in manner that restores the communication signal, for example back to its original state or to some derivative thereof. The signal processing that occurs following transmission over the communications channel can comprise amplifying or adding energy to one or more (or essentially all) frequencies of the changed signal or otherwise reversing the signal transformation that was implemented at the input end of the communications channel.

Accordingly, a digital or analog signal can be processed at an input end of a communication path so that the processed signal emits a reduced level of radiated emissions during propagation from the input end of the communication path to an output end of the communication path. At the output end of the communication path, a second application of signal processing can recreate or reproduce (in whole or in part) the digital or analog signal that existed prior to the signal processing implemented at the input end of the communication path.

The discussion of reducing radiated emissions presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

FIG. 4, are signal traces describing results of simulated testing of a communication system in accordance with an exemplary embodiment of the present invention.

Figure 1:
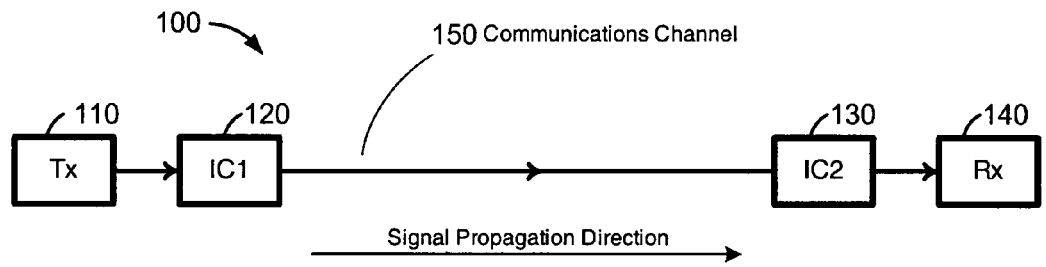
FIG. 1 is a functional block diagram of a communication system in accordance with one exemplary embodiment of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensional aspects may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention supports managing, controlling, reducing, or addressing radiated emissions on one or more communication paths or channels of a communication system while avoiding communication errors. An exemplary embodiment of the present invention processes signals at each end of a communication path to promote low-emission signal transmission on one hand and low-error signal detection on the other hand. Such an embodiment can be viewed as providing a "virtual shield" that uses signal processing and/or electronics to reduce radiated emissions as an alternative to (or as a supplement to) to shrouding a conductor with a metallic shield.

A device stationed at the input end of the channel can process signals flowing into the channel to promote signal transmission in the channel. More specifically, that input device can shape or transform the signals to provide a waveform that avoids radiating or spilling energy out of the channel while the signals propagate in the channel. A device at the opposite or output end of the channel can provide complementary signal processing that readies the output signal for reception. The output device can reverse or undo the signal shaping that occurred at the input end of the channel, thereby restoring the signal to its original form or quality.

A communication signal can have features, such as sharp rise times, that support bandwidth via facilitating extraction of data or information from the signal at a detector. However, the signal features that are beneficial from a detection and decoding perspective can be detrimental from a transmission perspective. During transmission along a communication path, those signal features can cause energy to emanate undesirably from the communication path. To achieve low-emission transmission, one signal processing device can remove the signal features in preparation for transmitting the signal through the communication path. After the signal transmits through the communication path and in preparation for signal detection, another signal processing device can add the signal features back in to the signal.

In other words, a device at an input end of a communication path can adapt a signal to improve the signal's transmission in the communication path. The signal adaptation can comprise removing signal features that induce radiation to emanate from the communication path. Since absence of the features could impair a receiver's ability to interpret the signal, a complementary device at the opposite end of the communication path can restore the removed signal features prior to signal reception.

Figure 2:
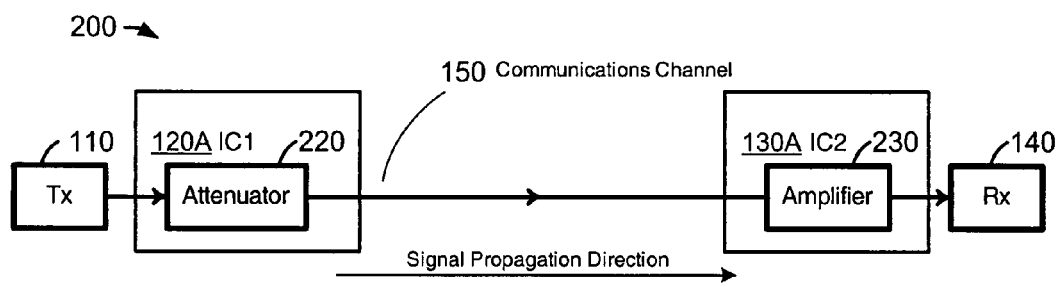
FIG. 2 is a functional block diagram of a communication system in accordance with one exemplary embodiment of the present invention.
Figure 3:
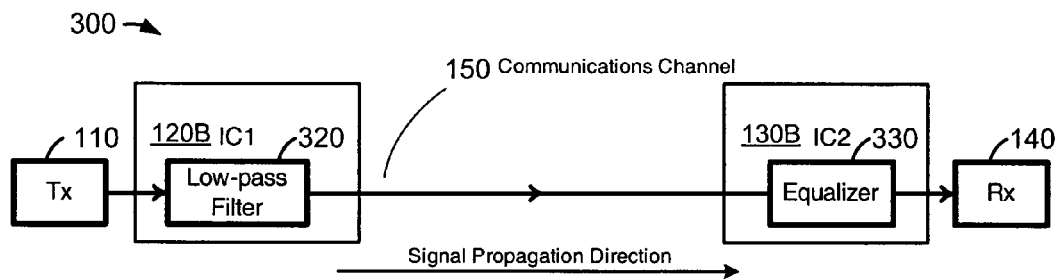
FIG. 3 is a functional block diagram of a communication system in accordance with one exemplary embodiment of the present invention.
Figure 5:
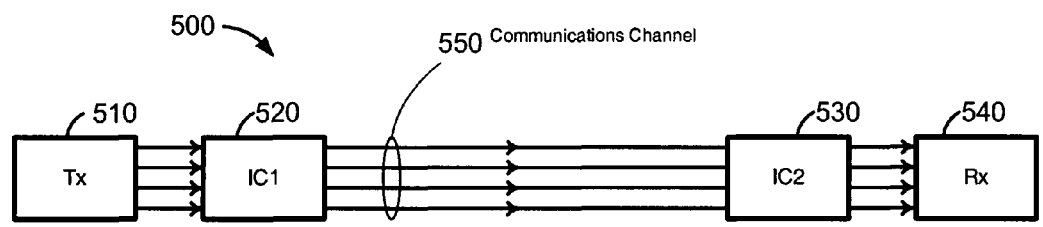
FIG. 5 is a functional block diagram of a communication system that comprises a multi-line communications channel in accordance with an exemplary embodiment of the present invention.
Figure 6:
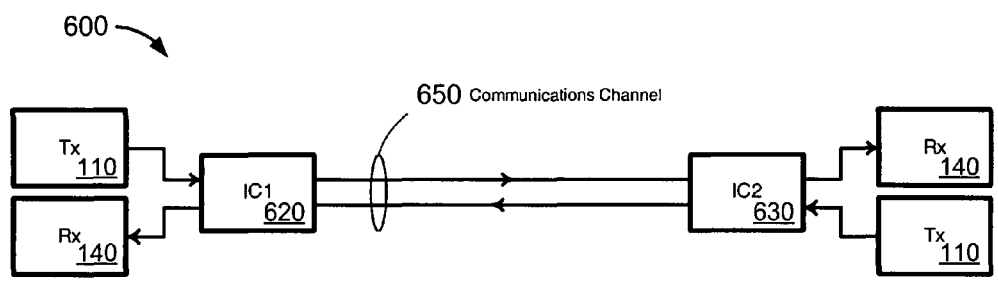
FIG. 6 is a functional block diagram of a communication system that comprises a bidirectional communications channel in accordance with an exemplary embodiment of the present invention.

A method and apparatus for avoiding unwanted radiation of signal energy from a communications channel will now be described more fully hereinafter with reference to FIGS. 1-7, which describe representative embodiments of the present invention. FIGS. 1-3 illustrate communication systems that each comprises a unidirectional signal transmission path and a capability for processing signals flowing into and out of the path. The signal processing reduces undesirable radiated emissions while sustaining desirable bandwidth. FIG. 4 presents simulated signal analysis results, in the form of software-generated "screen shots", describing representative operation of a communication system that reduces radiated emissions without compromising signal fidelity. FIGS. 5 and 6 illustrate communication systems that comprise communications channels for carrying multiple or bidirectional signals while suppressing radiated emissions and while maintaining receiver effectiveness.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Turning now to FIG. 1, this figure illustrates a functional block diagram of an exemplary communication system 100 according to an embodiment of the present invention. The system 100 comprises a communications channel 150 that carries signals from a transmitter 110 to a receiver 140. The communications channel 150 can comprise a conductor, a conductive strip, a signal path, a waveguide, a bus, a transmission line, a backplane line, a wire, a trace on a circuit board, or some other means for conveying signals, data, or information from the transmitter 110 to the receiver 140, for example. Signals propagating along or in the communications channel 150 can comprise electrical energy, electricity, electromagnetic radiation or energy, radiofrequency signals, microwave energy, voltage, current, electricity, or light, to mention a few examples.

In one exemplary embodiment, a single wire or conductor can provide a transmission medium for two or more communications channels 150, each communicating digital or analog information. Alternatively, multiple communications channels 150 can each have a dedicated transmission medium. For example, a circuit board can have multiple conductors in the form of circuit traces, with each trace providing a dedicated communications channel 150.

Two integrated circuits ("IC"s) 120, 130 process the signals to reduce the amount of radiant energy that the communications channel 150 emits as a result of the signals flowing therein (or thereon). Each of the ICs 120, 130 can comprise a multichip module ("MCM"), a monolithic system that comprises a semiconductor material such as silicon or indium phosphide, a hybrid, or a semiconductor substrate having transistors attached or integrated thereto, for example. The ICs 120, 130 can comprise analog components, digital components, digital logic, microcontrollers, digital signal processing ("DSP") capabilities, or analog signal processing capabilities, or some combination thereof, for example. In some exemplary embodiments, the system 100 can comprise a circuit board or a system or network of signal processing components for each of the ICs 120, 130. Accordingly, the exemplary system 150 comprises two signal processing devices or means 120, 130, one at each end of the communications channel 150, and those devices 120, 130 can be ICs (as illustrated) or other signal processing systems.

In an exemplary embodiment, the IC 120, at the transmit end of the channel 150, reduces the high-frequency energy of the transmitted signal that is flowing into (or onto) the communications channel 150. Reducing the high-frequency content provides a proportional reduction in the amount or level of radiation emitted by the channel 150.

While desirably reducing the amount of undesirable radiation emitted from the channel 150, a wholesale reduction of the high-frequency content can have an undesirable impact on signal reception, detection, and/or decoding. More specifically, the receiver 140 may struggle to reliably detect the resulting signal (with high frequency components suppressed or removed). To address and overcome this situation, the IC 130 counters, undoes, or reverses the distortions introduced by the IC 120. That is, the IC 130 reinserts the high-frequency content that the IC 120 removed.

In other words, the IC 120 transforms the signal from the transmitter 110 to facilitate transmission with reduced emission of EM radiation. Following transmission over the communications channel 150, the IC 130 transforms the signal back into its original form (typically within some reasonable tolerance) to facilitate robust or error-free detection by the receiver 140. Thus, the output of the IC 130 is a high-fidelity signal that has carried information over the channel 150 with reduced EM emissions. In one exemplary embodiment that output is a digital signal. Alternatively, the output can be an analog signal.

As the distortion or signal-processing transformation introduced by the IC 120 is known, the IC 130 is designed to counter or undo the distortion or transformation. In an exemplary embodiment, the IC 120 suppresses or attenuates certain high-frequency components of the signal, and the IC 130 amplifies those same high-frequency components.

More specifically, the high-frequency suppression and the high-frequency amplification are implemented in the same (or similar) proportions so that the signal incident upon the receiver 140 has essentially the same shape (and/or frequency content) as the signal that the transmitter 110 emitted. Thus, the transformations on each end of the communications channel can be viewed as matched reciprocals, complements, or inverses of one another.

The signal processing that the ICs 120, 130 implement can provide reduced EM emissions without physically modifying the communications channel 150. Thus, reduced emissions can be achieved without necessarily encasing the channel 150 in a conductive shield, such as a metallic tube, film, or tape, and without using complementary differential signals. However, in some instances, the signal processing discussed above can be applied to communication systems that comprise electrically conductive shields or that operate with differential signals.

In one exemplary embodiment, the illustrated communications channel 150 comprises metallic shielding that covers at least some portion of the channel's conductors. In one exemplary embodiment, the communication system 100 operates with differential signals as discussed above. In such embodiments, the ICs 120, 130 can provide an enhanced level of performance, for example.

In one exemplary embodiment, the communications channel 150 is unshielded or open, and the addition of the ICs 120, 130 expands the data carrying capabilities of that channel 150 (and the system 100 as a whole). Thus, an existing system can be upgraded from operating at a data rate less than 1 Gbps to operating at 2.5 Gbps, 5 Gbps, 10 Gbps, or some other expanded data rate.

Turning now to FIG. 2, this figure illustrates a functional block diagram of an exemplary communication system 200 according to an embodiment of the present invention. More specifically, FIG. 2 illustrates one exemplary embodiment of the system 100 of FIG. 1 in which the IC 120A comprises an attenuator 220 and the IC 130A comprises an amplifier 230.

The IC 120A at the transmitter end of the communications channel 150 attenuates the data signal output by the transmitter 110 via an application of broadband loss or broadband attenuation. That is, the attenuator 220 applies attenuation or scaling that is approximately constant or uniform over the frequency band of the data signal. Accordingly, the IC 120A outputs a signal onto the communications channel 150 that largely preserves the shape of the data signal, notwithstanding a scaling of the amplitude. In other words, the signal transmitting on the communications channel 150 has a reduced intensity relative to the signal output by the transmitter 110, and the intensity reduction is more-or-less uniform across that signal's range of frequencies.

Those skilled in the art will recognize that such a broadband attenuation can be accomplished in a variety of means, including a passive resistive network or an active attenuator, for example an amplifier with less than unity gain. In other words, the attenuator 220 can be one or more commercially available components, chips, or elements (or features integrated to an IC substrate). One having ordinary skill in the art and the benefit of the present disclosure, including the text and the appended drawings, would be able to make, use, and implement the attenuator 120 based on that skill and that disclosure. Moreover, one of ordinary skill in the art would be able to readily make and use the other systems, devices, methods, steps, and technologies disclosed herein based on the present teachings, descriptions, and disclosure. Accordingly, production of any additional circuit schematics (beyond those already described as examples in the text and accompanying figures) is not considered necessary to make and use the present invention.

Referring now to FIG. 2, to restore the signal for reception at the receiver 140 (following transmission over the communications channel 150), the IC 130A amplifies the received signal output from the channel 150. The IC 130A comprises an amplifier 230 that implements the amplification. In one exemplary embodiment, the amplifier 230 comprises a simple gain amplifier.

In another exemplary embodiment, the amplifier 230 comprises a limiting amplifier, such as an amplifier whose output swings from rail-to-rail. In the case of being a limiting amplifier, the amplifier 230 amplifies or applies gain to the transmitted signal while preventing the amplified signal from exceeding a predetermined signal level. That is, the limiting amplifier limits the intensity of the amplified signal to a predetermined level. The limiting amplifier embodiment can provide signal integrity benefits via reducing noise and signal ringing on the output of the IC 130A.

Turning now to FIG. 3, this figure illustrates a functional block diagram of an exemplary communication system 300 according to an embodiment of the present invention. In comparison to the system 200, the system 300 may provide improved signal attenuation at higher frequencies (or faster data rates) and thus enhanced suppression of EM emissions in some applications.

To obtain more high-frequency attenuation, the communication system 300 of FIG. 3 applies frequency dependent or frequency selective attenuation. In this exemplary embodiment, the IC 120B can compromise a low-pass filter 320 that passes low frequencies and attenuates or blocks high frequencies. As discussed above, the attenuated high frequencies can be frequency components of the signal that provide sharp transitions between discrete or digital states.

In an exemplary embodiment, the low-pass filter 320 has a cutoff frequency sufficiently low that the output of the IC 120B is distorted in shape and exhibits intersymbol interference or increased data dependent jitter. The cutoff frequency can describe a transition frequency below which signal frequencies pass and above which signal frequencies are significantly suppressed.

Figure 4A:
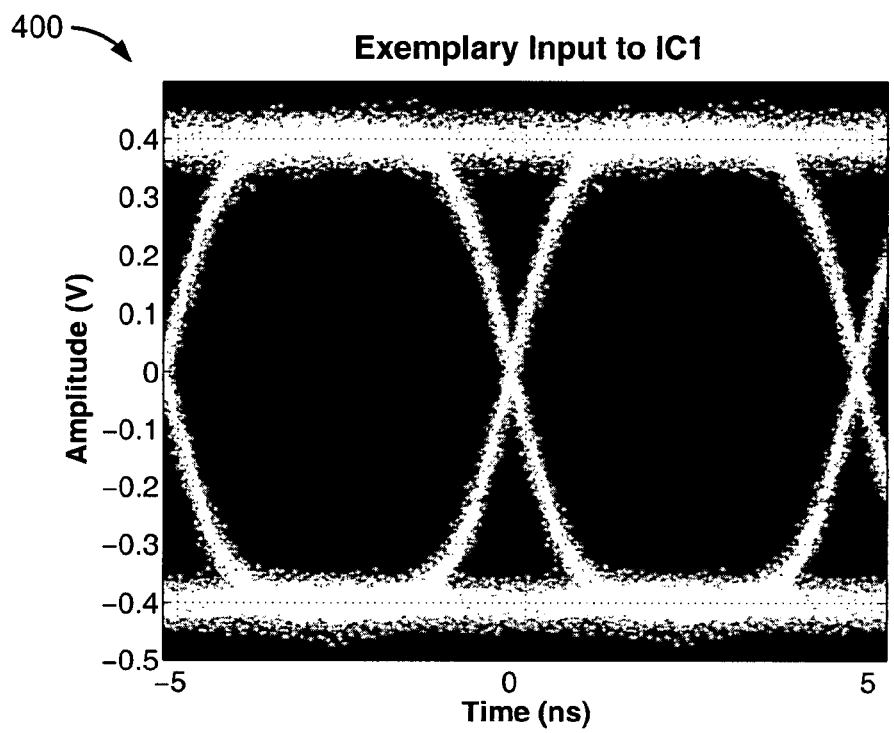
FIGS. 4A and 4B, collectively
Figure 4B:
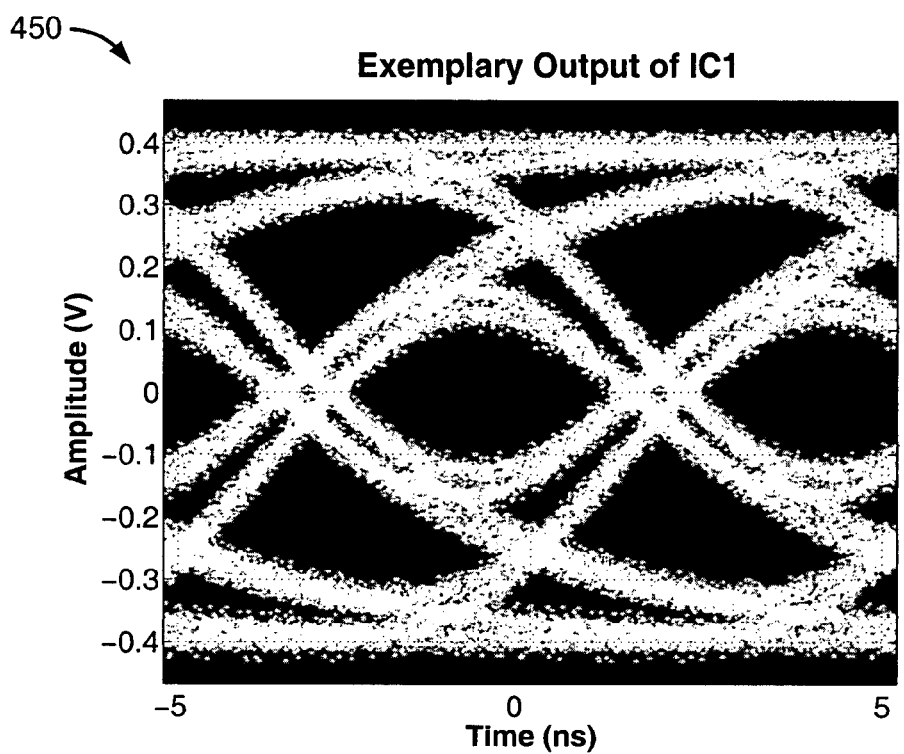

FIG. 4 illustrates exemplary data traces 400, 450 resulting from computer-based simulation of an exemplary embodiment of the communication system 300. More specifically, FIGS. 4A and 4B are screen shots that respectively describe the signals going into and out of a representative embodiment of the IC 120B. As discussed in additional detail below, FIGS. 4A and 4B illustrate how the signal processing of the IC 120B transforms, reshapes, and/or distorts the signal from the transmitter 110.

FIG. 4A is an eye diagram 400 for the digital signal that the transmitter 110 outputs and that the IC 120 receives and processes. As those skilled in the art will appreciate, the openness of the eye diagram 400 indicates that the signal is robust and stable and has a desirably low level of jitter. In other words, the pattern 400 indicates that a suitable detector or receiver should readily interpret and decode the signal to clearly extract the information that the signal carries.

FIG. 4B is an eye diagram 450 for the output of the IC 120B that results from the filter 320 applying low-pass filtering to the signal that FIG. 4A represents. That is, the eye diagram 450 describes a representative embodiment of the signal that launches onto the communications channel 150.

The eye diagram 450 of FIG. 4B contrasts with the eye diagram 400 of FIG. 4A. More specifically, the eye diagram 450 is significantly closed and distorted, implying that a detector might struggle to extract data from the signal if the signal was not improved (which is not the case in the system 300, since the IC 130B does process and improve the signal prior to interaction with the receiver 140).

To restore the data signal at the receiver 140, the IC 130B removes intersymbol interference or data dependent jitter by countering or equalizing the effect of the low-pass filter 320 in the IC 120B. Specifically, the IC 130B comprises an equalizer 330 that boosts the high-frequencies in the data frequency band in a manner commensurate with the frequency dependent attenuation introduced by the IC 120B. Thus, the IC 130B reinserts the frequency content that the IC 120B removed or suppressed.

In an exemplary embodiment, the composite response of the low-pass filter 320 and equalizer 330 provides an all-pass function over the frequency band of the data signal. In other words, the IC 130B removes the distortion introduced by the IC 120B via transforming the signal back into the original signal (with some deviation acceptable) that was output from the transmitter 110. Accordingly, an eye diagram of the signal output by the IC 130B could generally resemble the eye diagram 400 that FIG. 4A illustrates, as discussed above.

In one exemplary embodiment, the IC 130B further comprises an optional limiting-amplifier (not explicitly illustrated in FIG. 3) that processes the output of the equalizer 330. Applying limiting amplification can reduce noise and ringing that equalization may introduce.

In one exemplary embodiment, the IC 130B comprises a high-pass filter as a substitute for the equalizer 330. Further, the equalizer 330 may comprise a high-pass filter. Such a high-pass filter can attenuate frequencies that are below a threshold frequency and amplify frequencies that are above the threshold frequency. The high-pass filter can also be viewed as providing frequency selective gain, wherein gain increases as a function of frequency.

Turning now to FIG. 5, this figure illustrates a functional block diagram of an exemplary communication system 500 that comprises a multi-line communications channel 550 according to an embodiment of the present invention. The communications channel 550 of the communication system 500 can comprise a data bus or a system of multiple conductors or data lines that are adjacent one another. The exemplary system 500 can be viewed as an expansion of either the system 200 of FIG. 2 or the system 300 of FIG. 3, wherein the expansion accommodates multiple signal paths.

With the communications channel 550 comprising a plurality of data lines, a set of first ICs 520 at the transmitter 510 can have a corresponding plurality of attenuators, each as discussed above with respect to FIG. 2. That is, each of the conductors of the communications channel 550 can have an associated attenuator 220 and an associated amplifier 230 as illustrated in FIG. 2 and discussed above. The IC 520 and the IC 530 can each comprise either a plurality of ICs or one IC that implements multiple attenuations or amplifications.

In one exemplary embodiment, the system 500 comprises multiple instances of the system 200, disposed adjacent on another. In one exemplary embodiment, the transmitter 510 comprises multiple instances (or copies) of the transmitter 110, for example integrated in a common housing, chip module, package, or substrate. Likewise, the IC 520 can comprise multiple instances of the IC 120A; the IC 530 can comprise multiple instances of the IC 130A; and the receiver 540 can comprise multiple instances of the receiver 140. In such embodiments of the elements 510, 520, 530, and 540, the multiple instances can be collocated, commonly housed or packaged, or disposed on a common substrate.

In many situations, the multiple instances can share circuitry elements, such as power supplies, ground lines, etc. Thus, the IC 520 can comprise multiple attenuators 220 or a single attenuation system that operates similar to multiple attenuators. Likewise, the IC 530 can comprise either multiple amplifiers 230 (which may be limiting amplifiers) or an amplification capability that amplifies multiple signals. Accordingly, the IC 520 and the IC 530 can each provide a combined or integrated functionality that compactly and efficiently operates like multiple ones of the respective ICs 120A, 130A.

In one exemplary embodiment, the system 500 comprises multiple instances of the system 300 (see FIG. 3) in similar fashion to the embodiment based on the system 200 discussed above. In one exemplary embodiment, the IC 520 can comprise multiple low-pass filters 320 that each processes signals from the transmitter 510 and feeds a line on the multi-line communications channel 550. Moreover, the IC 520 can comprise a plurality of discrete low-pass filters 320, a hybrid circuit, a MCM, or a monolithically integrated system that is operative to filter multiple signal lines, for example.

Similarly, the IC 530 can comprise multiple equalizers 330 that each processes signals from a respective line of the communications channel 550 and feeds processed signals to the receiver 540. The IC 530 can comprise multiple equalizers 330 in the form of a hybrid, a monolithic chip, an integrated circuit, an MCM, a system of discrete elements, a network of transistor-type devices embedded or integrated on a silicon substrate via semiconductor processing based on photolithography, etc. For many applications, implementing multiple equalizers 330 on a single substrate or in a single integrated circuit package, rather than as discrete elements mounted on a circuit board, can provide a size and cost reduction and can simplify system design and testing.

Turning now to FIG. 6, this figure illustrates a functional block diagram of an exemplary communication system 600 that comprises a bidirectional communications channel 650 according to an embodiment of the present invention. The system 600 facilitates sending and receiving information or data between two points or locations.

Connecting additional instances or copies of the system 600 can provide a wide variety of network topologies. For example, a plurality of the communication systems 600 can be linked together to form a ring, a hub-and-spokes architecture, or a mesh network.

In the illustrated configuration, the system 600 can comprise two of the systems 200 illustrated in FIG. 2 or two of the systems 300 illustrated in FIG. 3. The two systems 200 or 300 can be arranged back-to-back (or side-by-side) so that one system 200, 300 provides communication in one direction and the other system 200, 300 provides communication in the opposite direction. For example, one system 300 can send data from a first location to a second location, while another system 300 can send data from the second location to the first location.

The IC 620 can comprise a low-pass filter 320 to process outgoing signals from the associated (nearby) transmitter 110 and an equalizer 330 to process incoming signals from the communications channel 650 that originated at the far transmitter 110. Similarly, the IC 630 can comprise a low-pass filter 320 and an equalizer 330 for processing incoming and outgoing signals. The ICs 620, 630 can comprise a monolithic integration, a hybrid integration, an MCM, discrete components attached to a common ceramic substrate or multilayer circuit board, or a traditional integrated circuit, for example.

In one embodiment, the system 600 is based on the underlying architecture of the system 200. In this situation, the IC 620 and the IC 630 each comprises an attenuator 220 for attenuating outgoing signals to the channel 650 and an amplifier 230 for amplifying signals received from the channel 650. The IC 620 and the IC 630 can be essentially identical to one another, within manufacturing tolerances or specifications.

In one exemplary embodiment (as illustrated), the communications channel 650 comprises a separate line for each communication direction. Alternatively, one communication medium can transmit signals in both directions (e.g. forward and backward). In such an embodiment, the communications channel 650 can be periodically dedicated to each transmission direction so that for any particular point in time, the channel 650 is actively transmitting in one direction only. However, in one embodiment, the communications channel 650 transmits in both directions concurrently so that incoming and outgoing signals may cross one another during transmission.

In one exemplary embodiment of the present invention, two of the systems 500 are combined in back-to-back (or side-by-side) configuration to yield a bidirectional, multi-signal system. Thus, the system 600 of FIG. 6 can comprise two of the systems 500, one system 500 transmitting in one direction and the other system 500 transmitting in the opposite direction. Accordingly, the communications channel 650 can comprise two of the communications channels 550 to provide a bidirectional bus that supports high bandwidth with reduced radiated emissions.

A process for managing or reducing radiated emissions of a communications channel will now be described. Certain steps in the processes described herein may naturally need to precede others for the present invention to function as described. However, the present invention is not limited to the order of the described steps if such order or sequence does not alter the functionality of the present invention. That is, it is recognized that some steps may be performed before or after other steps or in parallel with other steps without departing from the scope and spirit of the present invention.

Figure 7:
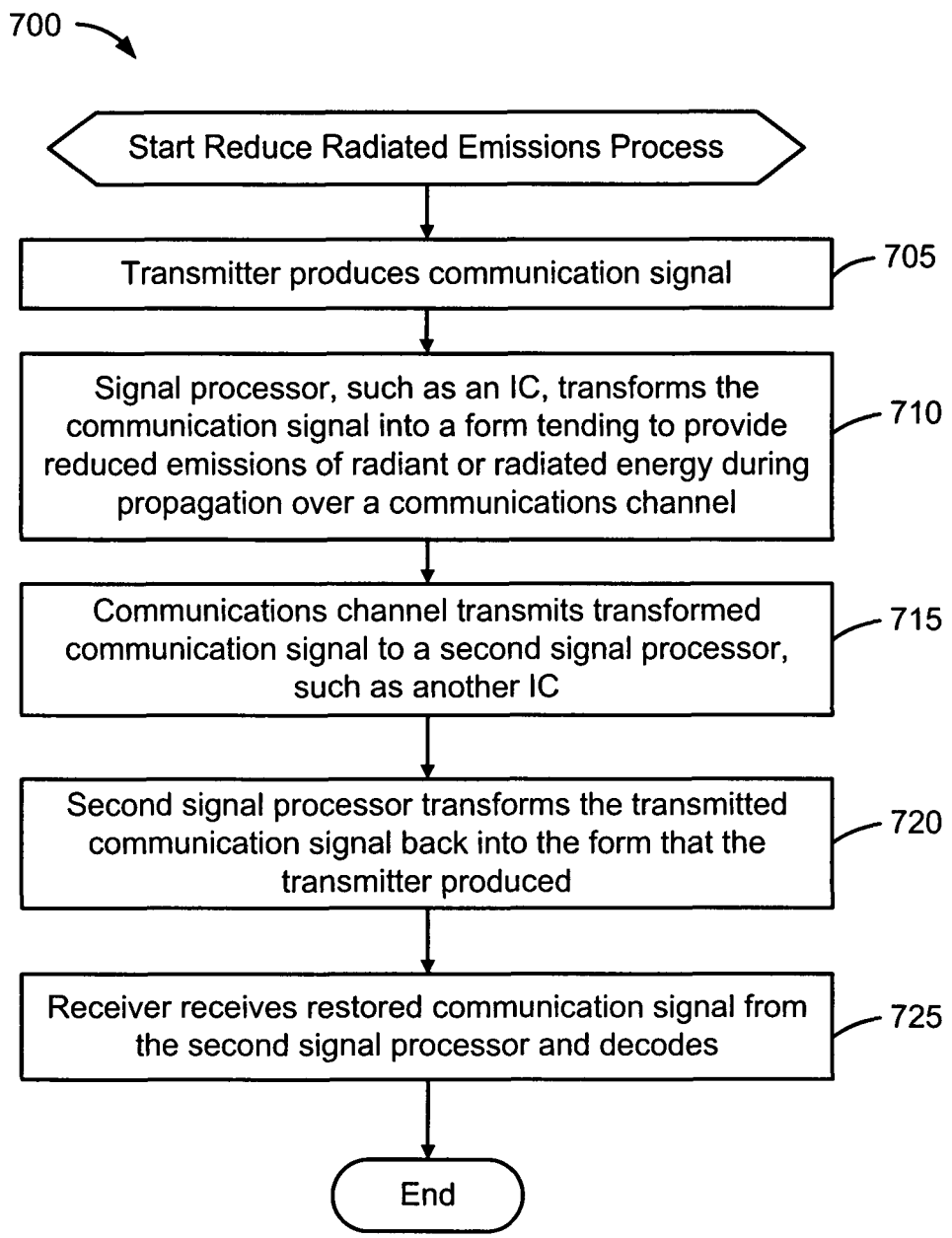
FIG. 7 is a flowchart of a process for managing radiated emissions from a communications channel in accordance with an exemplary embodiment of the present invention.

Turning now to FIG. 7, this figure illustrates a flowchart of an exemplary process 700 for managing radiated emissions from a communications channel 150 according to an embodiment of the present invention. The process 700, which is entitled Reduce Radiated Emissions, will be discussed with exemplary reference to FIG. 3.

At step 705, the transmitter 110 outputs, generates, or otherwise provides a digital or an analog communication signal. In an exemplary embodiment, the transmitter 110 can be a system, device, circuit, or apparatus that produces, outputs, generates, or provides communication signals, typically having information or data encoded or imprinted thereon.

At step 710, the IC 120B receives the communication signal from the transmitter 110. As discussed above, the communication signal typically has a desirable or open eye diagram and exhibits an acceptably or desirably low level of intersymbol interference. The IC 120B applies signal processing to the communication signal to create a transformed signal that is prone to providing reduced radiated emissions when propagating on the communications channel 150.

At step 715, the transformed signal transmits over the communications channel 150, and radiated emissions are low during transmission. In an exemplary embodiment, emissions may be sufficiently controlled to support high data rates, for example in excess of 2.5 Gbps or 10 Gbps, with an unshielded or open embodiment of the communications channel 150. Such data rates can be sustained without violating applicable FCC regulations, for example.

At step 720, the IC 130B processes the transformed signal that has transmitted over the communications channel 150, typically from end-to-end. The processing can comprise recreating or reproducing the communication signal that the transmitter 110 produced at step 705 above (or some facsimile or representation of that original signal).

At step 725, the receiver 140 receives the recreated or reproduced communication signal from the IC 130B. The receiver 140 typically extracts information or data via decoding the recreated or reproduced communication signal.

In one exemplary embodiment, process 700 ends following step 725. Alternatively, process 700 can loop back to step 705 to iterate steps 705-725. Accordingly, process 700 can support sustained or ongoing operation. The transmitter 110 can continue providing communication signals; the communications channel 150 can continue transmitting communication signals with decreased emissions; and the receiver 140 can continue decoding signals to provide transmitted data or information.

Although a system in accordance with one exemplary embodiment of the present invention can comprise a circuit, integrated or otherwise, that reduces radiated emissions of a communication signal transmitting over a communications channel, those skilled in the art will appreciate that the present invention is not limited to this application and that the embodiments described herein are illustrative and not restrictive. Furthermore, it should be understood that various other alternatives to the exemplary embodiments of the invention described here may be employed in practicing the invention.

Moreover, from the description, it will be appreciated that an embodiment of the present invention overcomes the limitations of the prior art. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A communication method comprising:
at a first end of a communication channel, receiving a data signal that has been distorted in shape and exhibits an intersymbol interference from the output of a low-pass filter at a second end of the communication channel, wherein a cutoff frequency of the low-pass filter is set to distort a shape of the data signal in comparison to an original signal at an input of the low-pass filter and to introduce the intersymbol interference, wherein the low-pass filter suppresses a frequency content above a threshold prior to transmission over the communication channel;
at the first end of the communication channel, processing the received data signal with an equalizer to restore the suppressed frequency content and a shape of the original signal, and to remove the intersymbol interference;
at the first end of the communication channel, applying amplification to the processed and received data signal; and
at the first end of the communication channel, detecting the amplified, processed, and received data signal with a receiver.

2. The communication method of claim 1, wherein applying amplification comprises applying limiting amplification.

3. The communication method of claim 2, wherein the processed and received data signal comprises noise, and wherein applying limiting amplification comprises reducing the noise.

4. The communication method of claim 1, wherein the equalizer comprises a high-pass filter.

5. The communication method of claim 4, wherein the high-pass filter attenuates frequencies that are below a threshold frequency and amplifies frequencies that are above the threshold frequency.

6. The communication method of claim 4, wherein filtering the data signal with the low-pass filter and processing the received data signal with the equalizer collectively comprises providing an all-pass function over the frequency band of the data signal.

7. The communication method of claim 4, wherein a transmitter disposed at the second end of the communication channel outputs the original signal to the low-pass filter, and wherein the processing of the received data signal with the equalizer transforms the received data signal back into the original signal.

8. A communication method comprising:
at a first end of a communication channel, receiving a data signal that has been distorted in shape and exhibits an intersymbol interference from the output of a low-pass filter at a second end of the communication channel, wherein a cutoff frequency of the low-pass filter is set to distort a shape of the data signal in comparison to an original signal at an input of the low-pass filter and to introduce the intersymbol interference, wherein the low-pass filter suppresses a frequency content above a threshold prior to transmission over the communication channel;
at the first end of the communication channel, processing the received data signal with a high-pass filter by restoring a shape of the original signal and removing the intersymbol interference;
at the first end of the communication channel, applying amplification to the processed and received data signal; and
at the first end of the communication channel, detecting the amplified, processed, and received data signal with a receiver.

9. The communication method of claim 8, wherein applying amplification comprises applying limiting amplification.

10. The communication method of claim 9, wherein the processed and received data signal comprises noise, and wherein applying limiting amplification comprises reducing the noise.

11. The communication method of claim 8, wherein processing the received data signal with the high-pass filter comprises attenuating frequencies that are below a threshold frequency and amplifying frequencies that are above the threshold frequency.

12. The communication method of claim 8, wherein the high-pass filter provides frequency selective gain that increases as a function of frequency.

* * * * *